Feb. 21, 1967 W. A. WILLIAMSON 3,305,232
HIGH CAPACITY TORSION SPRING
Filed Oct. 13, 1964
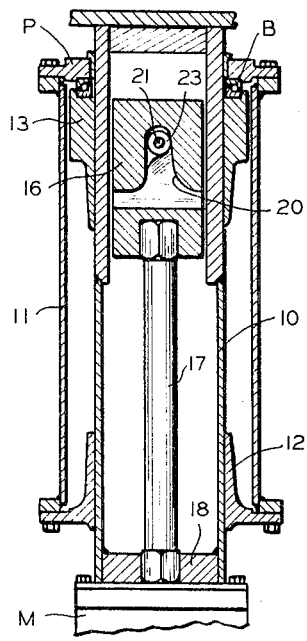
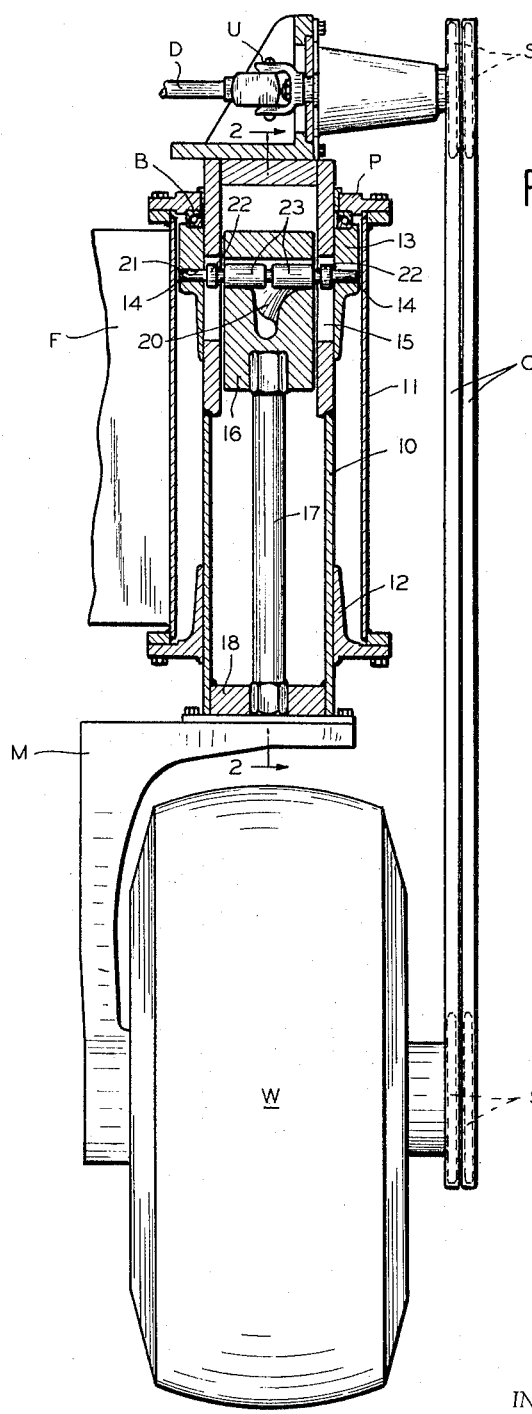
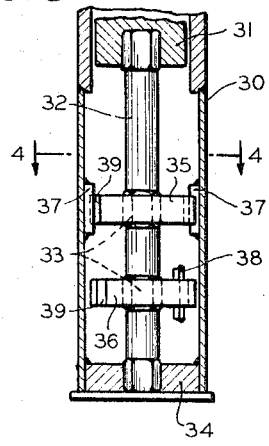
INVENTOR
WILLIAM A. WILLIAMSON
BY
William J. Cerny
ATTORNEY

United States Patent Office 3,305,232
Patented Feb. 21, 1967

3,305,232
HIGH CAPACITY TORSION SPRING
William A. Williamson, Battle Creek, Mich., assignor to Clark Equipment Company, a corporation of Michigan
Filed Oct. 13, 1964, Ser. No. 403,581
18 Claims. (Cl. 267—57)

The present invention relates to a torsion spring structure, and particularly to such a spring structure employed as a wheel suspension spring for a vehicle, especially heavy material-handling vehicles.

In wheeled vehicles, efficient spring suspensions for the wheels present problems, especially in the case of vehicles designed for transporting heavy loads, for example straddle carriers or other material-handling trucks. Many disadvantages inhere in the springs currently used in such vehicles. Leaf springs must be very large and heavy, and are subject to abrasion under load, thus suffering both a loss in efficiency and a shortening of the useful life thereof. Coil springs, because of their necessary interrelationship of wire diameter, coil diameter, and length, must usually be ruled out in applications requiring compactness, and thus are ordinarily limited to use where space considerations are not a factor. Hydropneumatic or oleopneumatic springs and liquid springs develop undesirably high temperatures in use, and in addition are subject to leakage, causing lowered efficiency and possibly leading to failure. Torsion springs normally require a long torsion arm to convert to rotary motion the linear motion of the wheel and vehicle relative to each other. This again necessitates a large space envelope to accommodate the spring structure, contra-indicating the use of such springs in applications where compactness is desired.

The present invention provides a spring construction which avoids or greatly reduces the disadvantages and difficulties of prior springs. Briefly, the spring structure disclosed herein employs a torsion rod or bar arranged to be subjected to torque upon relative longitudinal movement of two telescopingly related members, by means which do not require a long torque arm in order to develop the necessary rotary motion for twisting the torsion bar. The invention is illustrated as embodied in a vehicle, with a wheel carried by a fork tube swivelly and axially movable in a tubular frame member, the tube and tubular member constituting the relatively movable members acting upon the torque-applying means.

The invention further contemplates a torsion spring construction providing for a change in the spring rate of the torsion rod upon predetermined twisting thereof, or for a plurality of successive spring rate changes upon continuous twisting of the bar. Such a spring construction is of great usefulness in machines subjected to considerable variations in loadings.

It is an object of the invention to provide a vehicle wheel spring suspension structure in which linear relative movement between the wheel and vehicle applies torque to a spring torsion bar or rod, which structure is light in weight, compact, and versatile in adjusting to variable loading.

Another object of the invention is the provision of a torsion spring suspension for a vehicle wheel which is relatively light and does not require a long torque arm to apply rotary motion to the torsion spring as a result of linear relative motion between the wheel and vehicle.

Another object is the provision of a light and compact torsion spring suspension for a vehicle wheel which is readily applicable either to a steerable wheel or a non-steerable wheel.

A further object is the provision of a torsion spring structure in which relative motion of two members rectilinearly develops the torque on a torsion bar or rod without requiring provision for a long torque arm.

A further object of the invention is the provision of a torsion spring structure in which the spring rate of a torsion bar is changed upon a predetermined degree of twisting thereof.

Another object is the provision of a torsion spring structure in which the spring rate of a torsion bar may be successively changed by successive increments of twisting of the bar.

Other and further objects, advantages, and features of the invention will be apparent to those skilled in the art from the following description, taken in conjunction with the accompanying drawings, in which:

FIGURE 1 is an elevational view, partly in section, of a steerable wheel of a straddle carrier having the torsion spring structure of the invention applied thereto for suspension of the wheel;

FIGURE 2 is a longitudinal sectional view taken through the spring structure substantially as indicated by the line 2—2 of FIG. 1;

FIGURE 3 is a fragmentary sectional view similar to FIG. 2, but showing a modification of the invention in which the spring rate of a torsion bar may be varied upon twisting thereof; and FIGURE 4 is a cross-sectional view taken substantially as indicated by the line 4—4 of FIG. 3.

Referring first to FIGS. 1 and 2, there is shown a wheel W connected to the main frame F by a wheel fork tube 10 and a wheel fork or mount M. The frame F includes a vertical tubular member 11 in which the wheel fork tube 10 is rotatably, as well as slidably or telescopingly, received. The tubular member 11 is spaced from the fork tube, being secured at its lower end as by bolts or other suitable means to a flange of a lower sleeve 12 which engages about the tube 10. At its upper end, the tubular member 11 is suitably secured to a cap portion of floor or platform P of the vehicle, on which the load is carried. A ball bearing B, or other suitable anti-friction bearing surrounding the tube 10, is disposed between the load-bearing platform portion P and an upper sleeve 13 through which the fork tube 10 extends. On the upper end of the tube 10 is mounted a pair of sprockets S arranged to be driven by any suitable means, such as a drive shaft D through a universal joint U. A second pair of sprockets S is secured on the axle of the wheel W, and a pair of sprocket chains C is trained about both pairs of sprockets to drive the wheel from the shaft D. The wheel W thus may be driven in order to assist in moving the vehicle and its load, and may also be rotated about a vertical axis so as to steer the vehicle, although the wheel need not be either steerable or driven in order to employ the spring structure of this invention.

The upper sleeve 13 is provided with a pair of diametrically opposed apertures 14, and the fork tube 10 has a pair of diametrically opposed longitudinally extending slots 15 formed therein, the sleeve 13 surrounding the tube 10 in the area of the slots and having the apertures 14 registering with or opening to the slots 15. Within the wheel fork tube 10 there is disposed a reaction block 16, in rotatable and longitudinally movable relation to the tube. A torsion rod or bar 17 extending axially of the tube 10 has its upper end non-rotatably connected to the block 16, and its lower end non-rotatably secured to an anchor block 18 which is welded or otherwise fixedly secured to the tube 10. In the present instance, the securement of the torsion bar 17 to the reaction block 16 and anchor block 18 is shown as effected by hexagonal end portions of the bar received in correspondingly formed recesses in the respective blocks. Instead of a single axially disposed torsion bar, a plurality of such bars may be employed, preferably in a uniformly spaced arrangement.

The reaction member or block 16 is formed with a right helicoid slot therein, extending through 90°, and opening through diametrically opposed surface portions of the block. The reaction member or block 16 is so disposed relative to the torsion rod 17 and the tube 10 that in unstressed condition of the torsion bar, the upper end of the helicoid slot 20 extends diametrically between the slots 15 of the wheel fork tube, the lower end of the slot extending at right angles thereto. The apertures 14 of the sleeve 13, the slots 15 of the fork tube 10, and the upper end of the helicoid aperture or slot 20 thus lie in the same axial plane in unstressed condition of the torsion bar 17. A spindle or pin 21 extends through the helicoid slot 20 and longitudinal slots 15, and has its opposite ends engaged in the apertures 14 of the sleeve 13. A pair of roller members 22 are carried by the pin 21, one engaged in each of the slots 15, and a pair of rollers 23 on the pin 21 are disposed in the helicoid slot 20. The rollers 23 are arranged and adapted to ride on the surface of the helicoid slot, while the roller members 22 ride in the slots 15.

A load on the load-carrying members of the vehicle, represented in the drawing by the frame F and platform P, is transmitted through the upper sleeve 13 to the pin 21, and thereby to the rollers 23, which are moved downwardly together with the roller members 22. By reason of the engagement of the rollers 22 in the slots 15 of the wheel fork tube 10 and of the rollers 23 with the helicoid slot 20 in the reaction block 16, the downward movement results in relative rotation between the block 16 and tube 10, with consequent application of torque to the torsion bar 17. The torsion bar thus is stressed to provide resilient resistance to the downward movement of the load. The helicoid slot in the reaction block provides a helical track for the rollers 23 to change the rectilinear movement into rotary motion. The helical track might of course be provided by other thread-like means than the slot 20 in the block 16. The characteristics of the torsion rod are of course designed to achieve the desired springing of the load. The invention permits great flexibility in the design of the spring structure, since by changing the helix angle of the slot 20, the spring rate of a given torsion bar may be varied. Conversely, the length of the torsion bar may be increased or decreased as may be desired, and the same spring rate maintained. Additional design flexibility results from the possibility of using a plurality of torsion rods, as already mentioned, each of which is twisted by rotation of the reaction block. The invention thus lends itself to application in a great variety of design conditions. While the lower end of the helicoid slot 20 represents the limit of downward travel of the rollers 23 on the surface of the slot, it will be understood that the spring structure would normally be designed to stop downward movement of any load applied to the vehicle after downward movement of the rollers 23 only partially along the helical slot. In the drawings, the pin 21 and rollers 22 and 23 are shown as at the upper ends of the slots 15 and slot 20, as a matter of convenience, which would be the normal position with no load applied to the spring. Actually, a load is imposed on the spring by the weight of the frame and platform, so that the rollers 23 would move downwardly along the slot 20 and cause some twisting or loading of the torsion rod 17, even with the vehicle empty. The amount of such roller movement and the degree of twisting of the torsion bar would of course depend upon the weight of the frame and platform and any other portions of the vehicle applying a load to the sleeve 13, and the particular characteristics of the helicoid slot and of the torsion bar. In the construction as disclosed, the reaction block 16 is rotated in a counterclockwise direction, when viewed from above, upon downward movement of the rollers 23 on the surface of the helicoid slot 20, resulting in counterclockwise twisting of the torsion rod 17.

It has been pointed out that while the wheel W is rotatable about a vertical axis for steering, as well as being rotatable about its own axis for driving the vehicle, it is not necessary to the invention that the wheel W be driven, and similarly the wheel W need not be steerable, or if steerable may be arranged for steering by means not requiring rotation of the wheel fork tube or similar element. The invention contemplates essentially the use of two members rectilinearly movable relative to each other, in practice usually telescopingly related, to cause the twisting of the torsion rod as disclosed. If the wheel fork tube 10 need not be rotatable in the tubular frame member 11, the spring construction illustrated may be simplified by elimination of the bearing B and securement of the load bearing platform portion P to the sleeve 13 in any suitable manner, as by welding, the tubular member 11 then being eliminatable, or substitutable for the sleeve. It is also apparent that if desired the torsion rod 17 might be employed as the means connecting the wheel to the vehicle frame, in which case the tubular member 11, sleeves 12 and 13, and the bearing B could be eliminated. The tube 10 would then be fixed to the frame F, as by welding to the platform portion P, and would need extend downwardly only a sufficient distance to provide a telescoping relationship with the reaction member or block 16, the roller members 22 being omitted and the slots 15 replaced by apertures receiving the ends of the pin 21. The lower end of the torsion bar would be secured to the wheel mounting member M, instead of to the tube 10.

Many other variations of the structure coming within the concept disclosed might be made, as for example by securing the reaction block 16 to the pin 21, with the helicoid slot 20 formed in the lower portion of the block and receiving rollers carried by the upper end of the torsion bar 17. Again, the upper end of the torsion bar might be secured to the pin 21, and at its lower end carry the rollers 23 engaging in the helicoid slot of the reaction block, such block being fixed to the wheel fork tube 10.

As explained hereinabove, the spring rate of a given torsion bar may be varied in the construction disclosed by changing the helix angle employed in forming the helicoid slot 20, as well as by varying the number of torsion bars. A modified spring structure according to the invention which serves as another means for varying the spring rate of the torsion bar is illustrated in FIGS. 3 and 4. As shown in FIG. 3, a tubular member 30 is provided which may correspond to the wheel fork tube 10 of FIGS. 1 and 2, in which is disposed a reaction member or block 31 similar to the block 16, arranged for rotation and longitudinal movement relative to the tube 30. Non-rotatably secured to the block 31 is one end of a torsion bar 32 generally similar to the bar 17 but provided with a pair of hexagonal or other non-circular portions 33 spaced along its length. The other end of the torsion rod or bar 32 is non-rotatably connected to an anchor block 34 which is fixed to the tube 30 by welding or the like. Mounted on the hexagonal portions 33 for rotation therewith in rotation or twisting of the torsion bar are abutment members 35 and 36, which as shown are substantially identical. The two hexagonal portions on the torsion rod are shown in this case as located one midway of the length of the rod, and the other at a point one-fourth of the torsion rod length from the end of the rod secured in the block 34, the abutment member 35 being mounted on the hexagonal portion 33 at the center of the torsion bar 32, and the other abutment member 36 being mounted on the hexagonal portion nearer the anchor block 34. Welded or otherwise secured interiorly of the tube 30 in the diametrical plane of the abutment member 35 are a pair of diametrically oppositely disposed stop projections 37 extending radially inwardly for engagement by the abutment member 35. A similar pair of stop projections 38 are provided in the plane of the abutment member 36 for engagement thereby. Each of the abutment members 35 and 36 on the torsion bar 32 is formed so as to be clear of the stop projections 37 and 38, except for a pair of diametrically opposed radially extending abutment faces 39 which extend to a point close to the inner surface of the tube 30 so as to be engageable with the two stop projections 37, 37 or 38, 38 disposed in the respective plane of the abutment member. The respective abutment members are so arranged that the abutment faces 39 of each will come into engagement with the cooperating projections 37 or 38 upon a predetermined degree of twisting of the torsion bar.

With the torsion rod 32 in an unstressed, or in a predeterminedly stressed or twisted condition, the foregoing spaced condition of the respective abutment faces 39 and projections 37 and 38 obtains, and the effective spring length is the full length of the torsion bar. Application of a load then results in twisting of the bar over its full length, which gives a particular spring rate. When the twisting of the bar continues to a given value or degree, the abutment faces 39 of the abutment member 36 come into engagement with the stop projections 38, and the effective length of the torsion bar is reduced to three-fourths of its full length. This, of course, changes the spring rate of the torsion rod, and further twisting of the rod thus takes place only against a greater spring resistance, or "stiffer" spring. Such further twisting of the bar, if carried to a further predetermined degree, results in the abutment faces 39 of the abutment member 35 engaging the stop projections 37, reducing the effective spring length to one-half the length of the torsion bar 32, and again changing the spring rate. Thus predetermined increments of twist of the torsion bar 32 result in successive changes in the spring rate of the bar, permitting great flexibility in design of a spring structure embodying the disclosed concept. FIG. 4 shows the abutment faces of the abutment member 36 engaged with the stop projections 38, the faces 39 of the member 35 being still spaced from the stop projection 37, the positions of the parts in this figure corresponding to the positions in FIG. 3. In the present case, the stop projections 37 and 38 are shown as disposed in different diametrical planes, so as to be offset from each other, and the abutment faces of the abutment members 35 and 36 are similarly shown as disposed in different diametrical planes, but it will be appreciated that the abutment faces might be arranged in the same diametrical plane if desired, and the pairs of stop projections 37 and 38 offset circumferentially relative to each other to provide the difference in initial spacing between the several pairs of projections and the respective abutment faces. Again, all of the projections 37 and 38 might be disposed in the same diametrical plane, and the abutment members so formed or so disposed on the torsion bar 32 as to space the abutment faces 39 thereof from the respective projections by the required distances in the initial condition of the torsion bar 32. The only essential in this regard is that the initial spacing of the abutment faces 39 from the stop projections engageable thereby be such that engagement occurs upon the desired or predetermined increment or degree of twisting of the torsion rod.

Two abutment members are shown in the present instance, but it will be apparent that one or any desired plurality of abutment members might be employed, and that each may be disposed at any desired location along the length of the torsion bar. Of course, the arrangement of a plurality of abutment members with their cooperating stop projections must, to obtain successive changes in the spring rate upon successive increments of twisting of the bar, be such as to have the abutment members come into engagement with their associated stop projections successively in order from the anchored end of the torsion bar in the direction of the end to which the twisting force is applied by the reaction block 31. It will be understood that the relative positions of the abutment members 35 and 36 in FIG. 4 and the spacing between the faces 39 of the abutment member 35 and the stop projections 37, are merely illustrative, and do not represent any particular dimensions, measurements, or specific relationship. In FIGS. 3 and 4 the same direction of rotation and twisting is assumed as in the case of the block 16 and torsion rod 17 of FIGS. 1 and 2. It will be understood that it is not necessary to the spring rate changing construction of FIGS. 3 and 4 that the reaction block 31 be rotated by rectilinear movement of rollers or similar means in a helicoid slot formed in the block, but that other means for effecting relative rotation of the reaction block and tube 30 may be employed if desired, although of course the reaction block with the helicoid slot is definitely advantageous in this as in other modifications of the spring structure as shown in FIGS. 1 and 2.

It will be understood that the embodiment of the inventive concept illustrated herein is exemplary and not exhaustive, and that the invention is not limited to such embodiment, since modifications and variations thereof, some of which have been pointed out hereinabove, may be made without departing from the spirit and scope of the invention as set forth in the appended claims.

I claim:

1. A suspension spring structure for a vehicle, comprising a frame, a tubular support, sleeve means slidably mounting said support in said frame, a pair of longitudinal slots in opposed wall portions of said tubular support, a pair of opposed openings in the sleeve means on a common axial plane with said slots, a reaction block within the support in movable relation therewith, a helicoid aperture formed in said block opening through opposed surface portions thereof, a pin extending diametrically of the block, support and sleeve means and through said helicoid aperture, openings, and slots, a plurality of roller means on said pin engaging in the slots and aperture, a torsion bar extending axially of the support having one end non-rotatably secured to the reaction block, and means anchoring the other end of said torsion bar to the support in non-rotatable relation.

2. A suspension spring structure for a vehicle, comprising a frame, a tubular support on said frame, a reaction block within said support in movable relation therewith, a helicoid aperture formed in said block opening through opposite surfaces thereof, means rollable on the surface of said aperture and projecting outwardly beyond said opposite block surfaces, means on the support receiving the projecting portions of said rollable means, a torsion bar extending longitudinally in the support having one end non-rotatably secured to the block, and means non-rotatably securing the other end of said bar to the support.

3. A spring structure comprising a tubular support, sleeve means slidably carrying said tubular support, a pair of longitudinal slots in opposed wall portions of said support, a reaction block disposed in the support in relatively movable relation, a helicoid aperture formed in said block opening through opposed surface portions thereof, means extending through said helicoid aperture and slots and including means respectively rollable on the surfaces of the slots and aperture, opposed means on the sleeve means in a common axial plane with said slots and engaged with said extending means, and at least one torsion bar extending longitudinally of the support having one end non-rotatably secured to the reaction block and the other end secured in non-rotatable relation to the support.

4. A spring structure comprising a tubular support, a reaction block within said support in movable relation therewith, an elongated slot formed in said block opening through opposite surfaces thereof, means movable on the surface of said slot and projecting outwardly beyond said opposite block surfaces, means on the support receiving the projecting portions of said movable means, a torsion bar in the support having one end non-rotatably secured to the block and the other end non-rotatably secured to the support, said slot defining a helical track for the movable means to cause relative rotation between the block and support upon movement of the movable means relative to the block in a direction longitudinally of the support.

5. A spring structure comprising a tubular support, a reaction block within said support in movable relation therewith, an elongated slot formed in said block opening through opposite surfaces thereof, means movable on the surface provided by said slot and projecting outwardly beyond said opposite block surfaces, means on the support receiving the projecting portions of said movable means, a torsion bar in the support having one end non-rotatably secured to the block and the other end non-rotatably secured to the support, said slot being of a form defining a surface such as to cause relative rotation between the block and support upon movement of the movable means relative to the block in a direction longitudinally of the support.

6. A spring structure comprising a tubular support, a reaction member within said support in movable relation therewith and formed to define a helical track, movable means engaged with said track and having opposed portions extending outwardly of the reaction member in engaging relation to the support, and a torsion bar having opposite ends non-rotatably engaged respectively with the reaction member and the support.

7. A spring structure comprising a pair of telescopingly related tubular members, a reaction block disposed in the inner of said tubular members for movement relative thereto, a helicoid slot in said block opening through opposed surface portions thereof, means carried by the outer tubular member for movement therewith extending through said helicoid slot and engaged with the inner tubular member for movement relatively longitudinally thereof, a torsion bar extending longitudinally in the inner tubular member non-rotatably secured to the block, and means securing the other end of said torsion bar in non-rotatable relation to the inner tubular member.

8. A spring structure comprising a pair of telescopingly related tubular members, a reaction block movably disposed in the inner tubular member, means defining a helical track on said reaction block, means carried by the outer tubular member for movement therewith engaged with the inner tubular member for movement relatively longitudinally thereof and engaging on said helical track, and at least one torsion bar in the inner tubular member having its opposite ends non-rotatably secured respectively to the reaction block and the inner tubular member.

9. A spring structure comprising a pair of telescopingly related tubular members, a reaction block disposed in the inner of said tubular members for movement relative thereto, an elongated slot in said block opening through opposed surface portions thereof, means carried by the outer tubular member for movement therewith extending through said slot in contact with the surface thereof and engaged with the inner member for movement relatively longitudinally thereof, a torsion bar extending longitudinally in the inner member non-rotatably secured to the block, and means securing the other end of said torsion bar in non-rotatable relation to the inner member, said slot having a form such that said surface thereof effects relative rotation of the block and inner member upon said relative longitudinal movement.

10. A spring structure as defined in claim 9, including an abutment extending radially from an intermediate portion of the torsion bar, and an inwardly extending stop member on said inner tubular member engageable by said abutment upon predetermined partial twisting of the bar to change the spring rate thereof.

11. A spring structure as defined in claim 9, including a plurality of longitudinally spaced radially extending abutments on the torsion bar, and a similar plurality of inwardly projecting stop members on said inner tubular member spaced in correspondence to said abutments for respective engagement thereby upon successive increments of twisting of the bar to effect correspondingly successive changes in the spring rate of the bar.

12. A spring structure comprising a tubular member, a reaction member in said tubular member having a helical track defined thereon about the axis thereof, means movable longitudinally relative to the tubular member and movably engaged on said helical track for effecting relative rotation of said members upon said relative longitudinal movement, and a torsion bar extending longitudinally in the tubular member having one end non-rotatably secured thereto, said torsion bar being so related to the reaction member and movable means as to have torque applied thereto upon said relative longitudinal movement of the movable means.

13. A spring structure as defined in claim 12, including abutment means on the torsion bar, and stop means on the tubular member engageable by said abutment means to change the spring rate upon predetermined twisting of the bar.

14. A spring structure comprising a pair of telescopingly arranged members, a reaction member disposed in relatively movable and substantially coaxial relation with one of said telescoping members, means for effecting relative rotation of said reaction member and said one telescoping member upon telescoping movement of the telescoping members, and a torsion bar having its ends non-rotatably engaged one with the reaction member and the other with the one telescoping member.

15. A spring structure as defined in claim 14, including a radial projection on each of the torsion bar and said one member extending oppositely to each other and engageable upon predetermined partial twisting of the bar to change the spring rate thereof.

16. A spring structure as defined in claim 14, including a plurality of longitudinally spaced projections on the torsion bar, and a similar plurality of correspondingly spaced projections on said one member for respective engagement of corresponding projections upon successive increments of twisting of the bar to effect successive changing of the spring rate of the bar.

17. A spring structure comprising a pair of movable members arranged for rectilinear movement toward and from each other, a reaction member disposed in relatively rotatable and substantially coaxial relation with one of said movable members, a helical track formed about the axis of said reaction member, track-following means on the other movable member engaging on said helical track, a torsion rod non-rotatably engaged at one end with said one movable member and extending longitudinally thereof and non-rotatably engaged at its other end with the reaction member, abutment means on the torsion rod, and stop means on the one movable member engageable by said abutment means upon predetermined twisting of the rod, whereby to change the spring rate.

18. A torsion spring structure comprising an elongated support member, a relatively movable reaction member disposed in substantially coaxial relation with said support member, means for effecting relative rotation of said support and reaction members, a torsion bar having one end non-rotatably engaged with the reaction member and the other end non-rotatably engaged with the support member, and oppositely extending projection means on the torsion bar and the support member engageable upon predetermined relative rotation of the reaction and support members.

References Cited by the Examiner

UNITED STATES PATENTS 3,009,360  11/1961  Morsewich _____ 267—1
3,118,660  1/1964   Saniweski _____ 267—57

FOREIGN PATENTS 144,097  12/1935  Austria.

ARTHUR L. LA POINT, *Primary Examiner.*

R. M. WOHLFARTH, *Assistant Examiner.*